US012561600B2

(12) United States Patent　　　　(10) Patent No.:　US 12,561,600 B2
Talwar et al.　　　　　　　　　　　　(45) Date of Patent:　　Feb. 24, 2026

(54) LINEAR TIME ALGORITHMS FOR PRIVACY PRESERVING CONVEX OPTIMIZATION

(71) Applicant: Google LLC, Mountain View, CA (US)

(72) Inventors: Kunal Talwar, Sunnyvale, CA (US); Vitaly Feldman, Mountain View, CA (US); Tomer Koren, Herzliya (IL)

(73) Assignee: Google LLC, Mountain View, CA (US)

( * ) Notice: Subject to any disclaimer, the term of this patent is extended or adjusted under 35 U.S.C. 154(b) by 1121 days.

(21) Appl. No.: 16/953,977

(22) Filed: Nov. 20, 2020

(65) Prior Publication Data

US 2021/0158211 A1　　May 27, 2021

Related U.S. Application Data

(60) Provisional application No. 62/939,420, filed on Nov. 22, 2019.

(51) Int. Cl.
| | |
|---|---|
| *G06N 20/00* | (2019.01) |
| *G06F 17/18* | (2006.01) |
| *G06F 21/60* | (2013.01) |
| *G06N 3/08* | (2023.01) |

(52) U.S. Cl.
CPC ............. *G06N 20/00* (2019.01); *G06F 17/18* (2013.01); *G06F 21/60* (2013.01); *G06N 3/08* (2013.01)

(58) Field of Classification Search
CPC .......... G06N 20/00; G06N 3/08; G06F 17/18; G06F 21/60; G06F 17/11; G06F 21/6245
See application file for complete search history.

(56) References Cited

PUBLICATIONS

Bassily ("Private Stochastic Convex Optimization with Optimal Rates") arXiv:1908.09970v1 [cs.LG] Aug. 27, 2019 (Year: 2019).*
Sparks ("TuPAQ: An Efficient Planner for Large-scale Predictive Analytic Queries") See discussions, stats, and author profiles for this publication at: https://www.researchgate.net/publication/271771573 Article • Jan. 2015 (Year: 2015).*
Kifer ("Private Convex Empirical Risk Minimization and High-dimensional Regression") JMLR: Workshop and Conference Proceedings vol. 23 (2012) 25.1-25.40 (Year: 2012).*

(Continued)

*Primary Examiner* — Andrew J Jung
*Assistant Examiner* — Su-Ting Chuang
(74) *Attorney, Agent, or Firm* — Fish & Richardson P.C.

(57) ABSTRACT

Methods, systems, and apparatus, including computer programs encoded on computer storage media for training a machine learning model. The method includes obtaining a training data set comprising a plurality of training examples; determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes; and training a machine learning model on the training data set, comprising performing stochastic gradient descent according to the i) stochastic gradient descent step size schedule, ii) stochastic gradient descent noise schedule, and iii) stochastic gradient descent batch size schedule to adjust a machine learning model loss function.

25 Claims, 4 Drawing Sheets

(56) References Cited

PUBLICATIONS

Jain ("Making the Last Iterate of SGD Information Theoretically Optimal") arXiv:1904.12443v2 [math.OC] May 29, 2019 (Year: 2019).*

Feldman ("Private Stochastic Convex Optimization: Optimal Rates in Linear Time") STOC '20, Jun. 22-26, 2020, Chicago, IL, USA © 2020 Copyright held by the owner/author(s). (Year: 2020).*

Ge ("The Step Decay Schedule: A Near Optimal, Geometrically Decaying Learning Rate Procedure for Least Squares") arXiv:1904.12838v2 [cs.LG] Oct. 29, 2019 (Year: 2019).*

Nitanda ("Accelerated Stochastic Gradient Descent for Minimizing Finite Sums") Artificial Intelligence and Statistics (AISTATS) 2016, Cadiz, Spain (Year: 2016).*

Mohassel ("SecureML: A System for Scalable Privacy-Preserving Machine Learning") 2017 IEEE Symposium on Security and Privacy (SP) (Year: 2017).*

Abadi et al., "Deep learning with differential privacy," Proceedings of the 2016 ACM SIGSAC Conference on Computer and Communications Security, Oct. 2016, 308-318.

Bassily et al., "Private empirical risk minimization: Efficient algorithms and tight error bounds," 2014 IEEE 55th Annual Symposium on Foundations of Computer Science, Oct. 2014, 464-473.

Bassily et al., "Private stochastic convex optimization with optimal rates," Advances in Neural Information Processing Systems, 2019, 32:11282-91.

Bousquet et al., "Stability and generalization," Journal of Machine Learning Research, Mar. 2002, 499-526.

Bun et al., "Concentrated differential privacy: Simplifications, extensions, and lower bounds," Theory of Cryptography Conference, Nov. 2016, 635-658.

Chaudhuri et al., "Differentially private empirical risk minimization," Journal of Machine Learning Research, Mar. 2011, 12(3).

Chaudhuri et al., "Privacy-preserving logistic regression," Advances in Neural Information Processing Systems, 2008, 21:289-96.

Duchi et al., "Local privacy and statistical minimax rates," 2013 IEEE 54th Annual Symposium on Foundations of Computer Science, Oct. 2013, 429-438.

Dwork et al., "Calibrating noise to sensitivity in private data analysis," Theory of Cryptography Conference, Mar. 2006, 265-284.

Dwork et al., "Concentrated differential privacy," arXiv preprint arXiv:1603.01887, Mar. 2016, 18 pages.

Dwork et al., "Our data, ourselves: Privacy via distributed noise generation," In Annual International Conference on the Theory and Applications of Cryptographic Techniques, May 2006, 486-503.

Dwork et al., "The algorithmic foundations of differential privacy," Foundations and Trends in Theoretical Computer Science, Aug. 2014, 9(3-4):211-407.

Feldman et al., "Generalization of erm in stochastic convex optimization: The dimension strikes back," In Advances in Neural Information Processing Systems, 2016, 3576-3584.

Feldman et al., "High probability generalization bounds for uniformly stable algorithms with nearly optimal rate," arXiv preprint arXiv:1902.10710, Feb. 2019, 27 pages.

Feldman et al., "Privacy amplification by iteration," In 2018 IEEE 59th Annual Symposium on Foundations of Computer Science (FOCS), Oct. 2018, 521-532.

Feldman et al., "Private Stochastic Convex Optimization: Optimal Rates in Linear Time," Proceedings of the 52nd Annual ACM SIGACT Symposium on Theory of Computing, Jun. 2020, 439-449.

Hardt et al., "Train faster, generalize better: Stability of stochastic gradient descent," International Conference on Machine Learning, Jun. 2016, 1225-1234.

Harvey et al., "Tight analyses for non-smooth stochastic gradient descent," Conference on Learning Theory, Jun. 2019, 1579-1613.

Hazan et al., "Beyond the regret minimization barrier: optimal algorithms for stochastic strongly-convex optimization," The Journal of Machine Learning Research, Jan. 2014, 15(1):2489-512.

Iyengar et al., "Towards practical differentially private convex optimization," 2019 IEEE Symposium on Security and Privacy, May 2019, 299-316.

Jain et al., "(Near) Dimension Independent Risk Bounds for Differentially Private Learning," In ICML, 2014, 9 pages.

Jain et al., "Differentially Private Online Learning," 25th Annual Conference on Learning Theory, 2012. 24.1-24.34.

Jain et al., "Making the last iterate of sgd information theoretically optimal," arXiv preprint arXiv:1904.12443, Apr. 2019, 19 pages.

Kifer et al., "Private convex empirical risk minimization and high-dimensional regression," Conference on Learning Theory, Jun. 2012, 25-1.

Mironov et al., "Rényi differential privacy," 2017 IEEE 30th Computer Security Foundations Symposium, Aug. 2017, 263-275.

Papernot et al., "Scalable private learning with pate," arXiv preprint arXiv:1802.08908, Feb. 2018, 34 pages.

Papernot et al., "Semi-supervised knowledge transfer for deep learning from private training data," arXiv preprint arXiv:1610.05755, Oct. 2016.

Rényi et al., "On measures of entropy and information," Proceedings of the Fourth Berkeley Symposium on Mathematical Statistics and Probability, 1961, 15 pages.

Shalev-Shwartz et al., "Learnability, stability and uniform convergence," The Journal of Machine Learning Research, Dec. 2010, 11:2635-70.

Shalev-Shwartz et al., "Stochastic Convex Optimization," Colt, Jun. 2009, 36 pages.

Shamir et al., "Stochastic gradient descent for non-smooth optimization: Convergence results and optimal averaging schemes," International Conference on Machine Learning, Feb. 2013, 71-79.

Smith et al., "Is interaction necessary for distributed private learning?," 2017 IEEE Symposium on Security and Privacy, May 2017, 58-77.

Song et al., "Stochastic gradient descent with differentially private updates," 2013 IEEE Global Conference on Signal and Information Processing, Dec. 2013, 245-248.

Talwar et al., "Nearly optimal private lasso," Advances in Neural Information Processing Systems, 2015, 28:3025-33.

Thakurta et al., "Differentially private feature selection via stability arguments, and the robustness of the lasso," Conference on Learning Theory, Jun. 2013, 819-850.

Ullman et al., "Private multiplicative weights beyond linear queries," Proceedings of the 34th ACM SIGMOD-SIGACT-SIGAI Symposium on Principles of Database Systems, May 2015, 303-312.

Wang et al., "Differentially private empirical risk minimization revisited: Faster and more general," Advances in Neural Information Processing Systems, 2017, 2722-2731.

Wu et al., "Bolt-on differential privacy for scalable stochastic gradient descent-based analytics," Proceedings of the 2017 ACM International Conference on Management of Data, May 2017, 1307-1322.

* cited by examiner

*200*

Obtain training data

202

Determine i) step size schedule, ii) noise schedule, and iii) batch size schedule including sequence of varying batch sizes

204

Train machine learning model on training data by performing stochastic gradient descent according to the step size schedule, noise schedule and batch size schedule to adjust machine learning model loss function

206

400

Obtain training data
402

Select target differential privacy parameters
404

Train machine learning model on training data by iteratively localizing a minimizer of population loss until a predetermined number of iterations is complete
406

LINEAR TIME ALGORITHMS FOR PRIVACY PRESERVING CONVEX OPTIMIZATION

BACKGROUND

This specification relates to machine learning.

Stochastic convex optimization (SCO) is the problem of minimizing the expected loss (also referred to as population loss) $F(w)=\mathbb{E}_{x\sim\mathcal{P}}[f(w, x)]$ for convex loss functions $f$ of $w$ over a d-dimensional convex body $\mathcal{K}$ given access to independent and identically distributed samples $x_1, \ldots, x_n$ from the data distribution $\mathcal{P}$. The performance of an algorithm for the problem is measured by bounding the excess (population) loss of a solution w, that is the value $$F(w) - \min_{v\in\mathcal{K}} F(v).$$

This problem is central to numerous applications in machine learning and arises for example in least squares/logistic regression, or minimizing a convex surrogate loss for a classification problem. It also serves as the basis for the development of continuous optimization algorithms in the non-convex setting.

Differential privacy (DP) is a framework for measuring the privacy guarantees provided by an algorithm. Differential privacy can be used to design and produce machine learning models that responsibly train models on private data. A machine learning model trained with differential privacy is not affected by any single training example, or small set of training examples, in its data set. Learning with differential privacy mitigates the risk of exposing sensitive training data in machine learning, and provides provable guarantees of privacy.

SUMMARY

This specification describes methods and systems for performing linear time privacy preserving convex optimization algorithms.

In general, one innovative aspect of the subject matter described in this specification can be embodied in a method that includes obtaining a training data set comprising a plurality of training examples; determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes; and training a machine learning model on the training data set, comprising performing stochastic gradient descent according to the i) stochastic gradient descent step size schedule, ii) stochastic gradient descent noise schedule, and iii) stochastic gradient descent batch size schedule to adjust a machine learning model loss function.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the sequence of varying batch sizes comprises a monotonically increasing sequence of varying batch sizes.

In some implementations the sequence of varying batch sizes has predetermined length T, and wherein a batch size at position $1\leq t\leq T$ is proportional to $1/\sqrt{T-t+1}$.

In some implementations batch sizes in the sequence of varying batch sizes increase at a rate that is dependent on the dimension of the machine learning model, wherein the rate increases as the dimension increases.

In some implementations a maximum batch size in the sequence of varying batch sizes is dependent on the dimension of the machine learning model, wherein the maximum batch size increases as the dimension increases.

In some implementations batch sizes in the sequence of varying batch sizes decrease as the number of training examples in the training data set increases.

In some implementations the batch sizes in the sequence of varying batch sizes increase as a target machine learning model differential privacy increases.

In some implementations determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises: receiving values of target differential privacy parameters $\alpha$, $$\alpha \cdot \frac{\rho^2}{2};$$

receiving a total number of time steps T; determining i) a sequence of T step sizes $\{\eta_t\}_{t\in T}$, ii) a sequence of T noise parameters $\{\sigma_t\}_{t\in T}$, and iii) a sequence of T varying batch sizes $\{B_t\}_{t\in T}$, wherein the sequence of T step sizes $\{\eta_t\}_{t\in T}$, sequence of T noise parameters $\{\sigma_t\}_{t\in T}$, and sequence of T varying batch sizes $\{B_t\}_{t\in T}$ satisfy $$\rho = 2L \cdot \max_{t\in[T]}\left\{\frac{\eta_t}{B_t\sqrt{\sum_{s=t}^{T}\eta_s^2\sigma_s^2}}\right\}$$

where L represents the Lipschitz continuity of the machine learning model loss function.

In some implementations the machine learning loss function is β-smooth, and wherein each step size in the sequence of T step sizes is less than or equal to 2/β.

In some implementations the determined stochastic gradient descent step size schedule comprises a sequence of varying step sizes, the determined stochastic gradient descent noise schedule comprises a sequence of varying noise parameters, or both the determined stochastic gradient descent step size schedule comprises a sequence of varying step sizes and the determined stochastic gradient descent noise schedule comprises a sequence of varying noise parameters.

In some implementations the determined stochastic gradient descent noise schedule comprises a sequence of Gaussian noise parameters.

In some implementations the determined stochastic gradient descent noise schedule comprises a sequence of noise parameters whose values are determined based on one or more of: the dimension of the machine learning model, the Lipschitz continuity of the machine learning model loss function, a the rate of change of the machine learning model loss function.

In some implementations determining a stochastic gradient descent step size schedule comprises determining the stochastic gradient descent step size schedule based on a target machine learning model accuracy.

In some implementations the determined stochastic gradient descent step size schedule comprises a sequence of constant step sizes and the determined stochastic gradient descent noise schedule comprises a sequence of constant noise parameters.

In some implementations determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises: obtaining values of target differential privacy parameters; obtaining a total number of time steps T; determining a sequence of T varying batch sizes, wherein a t-th batch size in the sequence of T varying batch sizes is equal to $\lceil 2\sqrt{d/(T-t+1)}/\rho \rceil$ where d represents the dimension of the machine learning model.

In some implementations the method further comprises determining a sequence of T step sizes, wherein each step size in the sequence of T step sizes is equal to $D/(L\sqrt{2T})$ where L represents the Lipschitz continuity of the machine learning model loss function and D represents a diameter of a convex set of machine learning model weights; and determining a sequence of T noise parameters, wherein each noise parameter in the sequence of T noise parameters is equal to $L/\sqrt{d}$.

In some implementations the machine learning model achieves utility in a last iterate of the performed stochastic gradient descent.

In some implementations the determined stochastic gradient descent step size schedule comprises a sequence of step sizes that decrease in size after a particular position in the sequence of step sizes.

In some implementations the determined stochastic gradient descent noise schedule comprises a sequence of constant noise parameters.

In some implementations determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises: obtaining values of target differential privacy parameters; obtaining a total number of time steps T; determining a sequence of T varying batch sizes, wherein a t-th batch size in the sequence of T varying batch sizes is equal to $\lceil 4\sqrt{3d/(T-t+1)}/\rho \rceil$ where d represents the dimension of the machine learning model.

In some implementations the method further comprises determining a sequence of T noise parameters, wherein each noise parameter in the sequence of T noise parameters is equal to $L/\sqrt{d}$.

In some implementations the machine learning model achieves utility in a last iterate of the performed stochastic gradient descent.

In some implementations the training data set comprises sensitive data. The sensitive may include one or more of: visual data and/or audio data.

In general, another innovative aspect of the subject matter described in this specification can be embodied in a method that includes obtaining a training data set comprising a plurality of training examples; obtaining values of target differential privacy parameters; and iteratively localizing a minimizer of population loss until a predetermined number of iterations is completed, comprising, for each iteration: training a machine learning model for the iteration on the training data set using a non-private stochastic convex optimization algorithm to adjust a convex loss function and obtain trained machine learning model parameters; determining, based on the target differential privacy and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the method further comprises determining a non-private stochastic convex optimization step size 77 based on a target machine learning model stability In some implementations training a machine learning model for the iteration on the training data set using a non-private stochastic convex optimization algorithm to adjust a convex loss function and obtain trained machine learning model parameters comprises: determining a total number of steps $n_1$ for the iteration, wherein the total number of steps for the iteration is equal to $2^{-i}n$ where n represents the number of training examples and i represents the iteration; determining a step size $\eta_i$ for the iteration, wherein the step size for the iteration is equal to $4^{-i}\eta$; and running the non-private stochastic convex optimization algorithm with the step size for the iteration and for the total number of steps for the iteration.

In some implementations the quantities of noise for the iterations decrease with decreasing step sizes for the iterations.

In some implementations the noisy machine learning models for the iterations achieve utility in a last step of the non-private stochastic convex optimization algorithm.

In some implementations training a machine learning model for the iteration on the training data set using a non-private stochastic convex optimization algorithm to adjust a convex loss function comprises implementing a step size schedule with exponential decay.

In some implementations the convex loss function is strongly convex, and wherein training a machine learning model for the iteration on the training data set using a non-private stochastic convex optimization algorithm to adjust a convex loss function comprises implementing a step size schedule with double exponential decay.

In some implementations the convex loss function is strongly convex, and wherein training a machine learning model for the iteration on the training data set using a non-private stochastic convex optimization algorithm to adjust the strongly convex loss function and obtain trained machine learning model parameters comprises: determining a total number of steps $n_i$ for the iteration, wherein the total number of steps for the iteration is equal to n/k where n represents the number of training examples and k represents the predetermined number of iterations and is equal to ln ln n; determining a step size $\eta_i$ for the iteration, wherein the step size for the iteration is equal to $2^{-2^i}\eta$ where $\eta$ is proportional to ln n/n; and running the non-private stochastic convex optimization algorithm with the step size for the iteration and for the total number of steps for the iteration.

In some implementations the quantities of noise for the iterations decrease with decreasing step sizes for the iterations.

In some implementations the noisy machine learning models for the iterations achieve utility in a last step of the non-private stochastic convex optimization algorithm.

In some implementations determining, based on the target differential privacy and a number of previous iterations, a quantity of noise for an iteration i comprises sampling from a d-dimensional normal distribution with zero mean and standard deviation equal to $$\sigma_i = \frac{4L\eta_i}{\rho}$$

where d represents the machine learning model dimension, L represents the Lipschitz continuity of the convex loss function, $\eta_i$ represents non-private stochastic convex optimization algorithm step size for the iteration, and p represents the target differential privacy.

In some implementations the non-private stochastic convex optimization algorithm comprises bounded $L_2$-sensitivity.

In some implementations the convex loss function is sufficiently smooth and the non-private stochastic convex optimization algorithm comprises a stochastic gradient descent algorithm.

In some implementations the convex loss function is non-smooth and the non-private stochastic convex optimization algorithm comprises an empirical risk minimization algorithm.

In some implementations training a machine learning model for the iteration on the training data set to obtain a trained machine learning model comprises training the machine learning model for the iteration on a respective subset of the training data set to obtain a trained machine learning model.

In some implementations the respective subsets of the training data set are disjoint sub sets.

In some implementations the method further comprises, when the predetermined number of iterations is equal to the ceiling function of the logarithm base 2 of the number of the plurality of training examples.

In some implementations the training data set comprises sensitive data. The sensitive data may include one or more of: visual data and/or audio data.

The subject matter described in this specification can be implemented in particular embodiments so as to realize one or more of the following advantages.

Some known techniques for solving DP SCO, i.e., techniques different to those described in the present disclosure, map DP SCO problems to the easier problem of minimizing an empirical loss (referred to as empirical risk minimization (ERM)) for which tight upper and lower bounds on the excess loss are known. Upper bounds for the differentially private ERM can be translated to upper bounds on the population loss using uniform convergence of empirical loss to population loss. However, in general, this approach leads to suboptimal bounds. For example, there exist distributions over loss functions over $\mathbb{R}^d$ for which the best bound on uniform convergence is $\Omega(\sqrt{d/n})$. As a result, the in high-dimensional settings often considered in modern machine learning, e.g., n=$\ominus$(d), bounds based on uniform convergence are $\Omega(1)$ and do not lead to meaningful bounds on population loss.

Other known techniques for solving DP SCO address population loss include algorithms that achieve bounds of $$O\left(\frac{1}{\sqrt{n}} + \frac{\epsilon^{-1}\sqrt[4]{d}}{n}\right).$$

This bound is comparable to the non-private SCO bound $$O\left(\frac{1}{\sqrt{n}}\right)$$

as long as $$\frac{d}{\epsilon^2} = O(n).$$

However, these algorithms are based on solving the ERM via noisy stochastic gradient descent and requires large batch sizes for privacy analysis. As a result, the algorithms use $$O\left(\min\left\{n^{\frac{3}{2}}, \frac{n^{\frac{5}{2}}}{d}\right\}\right)$$

gradient computations, which is substantially less efficient than the optimal non-private algorithms for the problem which require only n gradient evaluations. Other known techniques for solving DP SCO using ERM improve computational efficiency at the cost of worse utility bounds.

The techniques described in this specification overcome the above described deficiencies. The algorithms described in the present disclosure are linear-time algorithms that achieve optimal bounds on excess population loss. The algorithms are constructed such that, for the problem of Stochastic Convex Optimization, a privacy constraint is achieved without additional cost. In cases where the loss function dimension d is less than the number of training samples n there is no overhead in terms of either excess loss or computational efficiency. For loss function dimensions that are larger than the number of training samples, the excess loss increases but the optimal bounds are achieved without additional computational overhead.

Unlike known algorithms for DP SCO which rely on uniform stability of the algorithm to ensure generalization, e.g., those that map the DP SCO task to the easier problem of minimizing an empirical loss, the presently described algorithms directly optimize the population loss. Formally, the presently described algorithms satisfy the following bound: Let $\mathcal{K} \subseteq \mathbb{R}^d$ represent a convex set of diameter D, $\{f(\cdot, x)\}_{x \in X}$ represent a family of convex L-Lipschitz and β-smooth functions over $\mathcal{K}$. For every ρ>0 and given a starting point $w_o \in \mathcal{K}$ and S∈X$^n$, any one of the presently described algorithms $\mathcal{A}$ returns a point ŵ. For all α≥1, the algorithm $\mathcal{A}$ uses n evaluations of the gradient of $f(w, x)$ and satisfies (α, α·ρ²/2)–RDP for $$\beta \leq \frac{cL}{D} \min\left( \sqrt{n}, \frac{\rho n}{\sqrt{d}} \right)$$

for universal constant c. Further, for S including samples drawn from an independent and identical distribution P over X, then $$\mathbb{E}[F(\hat{w})] \leq F^* + O\left( DL \cdot \left( \frac{1}{\sqrt{n}} + \frac{\sqrt{d}}{\rho n} \right) \right)$$

where for all $\in \mathcal{K}$ F(w)=$\mathbb{E}_{x \sim P}[f(w,x)]$, $$F^* = \min_{w \in K} F(w)$$

and the expectation is taken over the choice of S and randomness of the algorithm. Alternatively, the bound can be stated in terms of (ε, δ)–DP where $$\mathbb{E}[F(\hat{w})] \leq F^* + O\left( DL \cdot \left( \frac{1}{\sqrt{n}} + \frac{\sqrt{dln\left(\frac{1}{\delta}\right)}}{\varepsilon n} \right) \right)$$

(which matches tight bounds for techniques that solve ERM and rely on uniform stability of the algorithms).

In addition, the presently described algorithms can be performed to train a machine learning model at a remote computer system with authorized access to a training database including sensitive training data. Once trained by this remote system, the model may be deployed to one or more further computing devices and/or one or more further computing devices may be given access to the model. The one or more further computer devices may thus be provided with the benefit of a model trained on the sensitive data without either direct or indirect (i.e. via inference from the model output) unauthorized access to the sensitive data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for performing differentially private convex optimization algorithms that achieve an optimal bound on excess population loss and that require a reduced number of gradient computations. In addition, the differentially private convex optimization algorithms match the running time of known optimal non-private algorithms.

In one approach, a one-pass noisy stochastic gradient descent algorithm is implemented with varying batch sizes—a hyper parameter that controls the number of training samples to process before model parameters are updated. The batch sizes can gradually grow with each iteration of the stochastic gradient descent algorithm. For example, at step t of T, the batch size can be proportional to $1/\sqrt{T-t+1}$.

Another approach is based on an (implicit) reduction to the problem of localizing an approximate minimizer of the population loss. Specifically, the reduction is to a differentially private algorithm that, given a point $w_0$ that is within distance R from the minimizer of the loss, finds a point w that is within distance R/2 from a point that approximately minimizes the loss. By iteratively using the localizing algorithm with appropriately chosen parameters, a sufficiently good solution can be found after a logarithmic number of applications of the algorithm. Each application can operate on its own subset of the training data set and therefore this reduction can preserve the privacy guarantees of the localizing algorithm.

Figure 1:
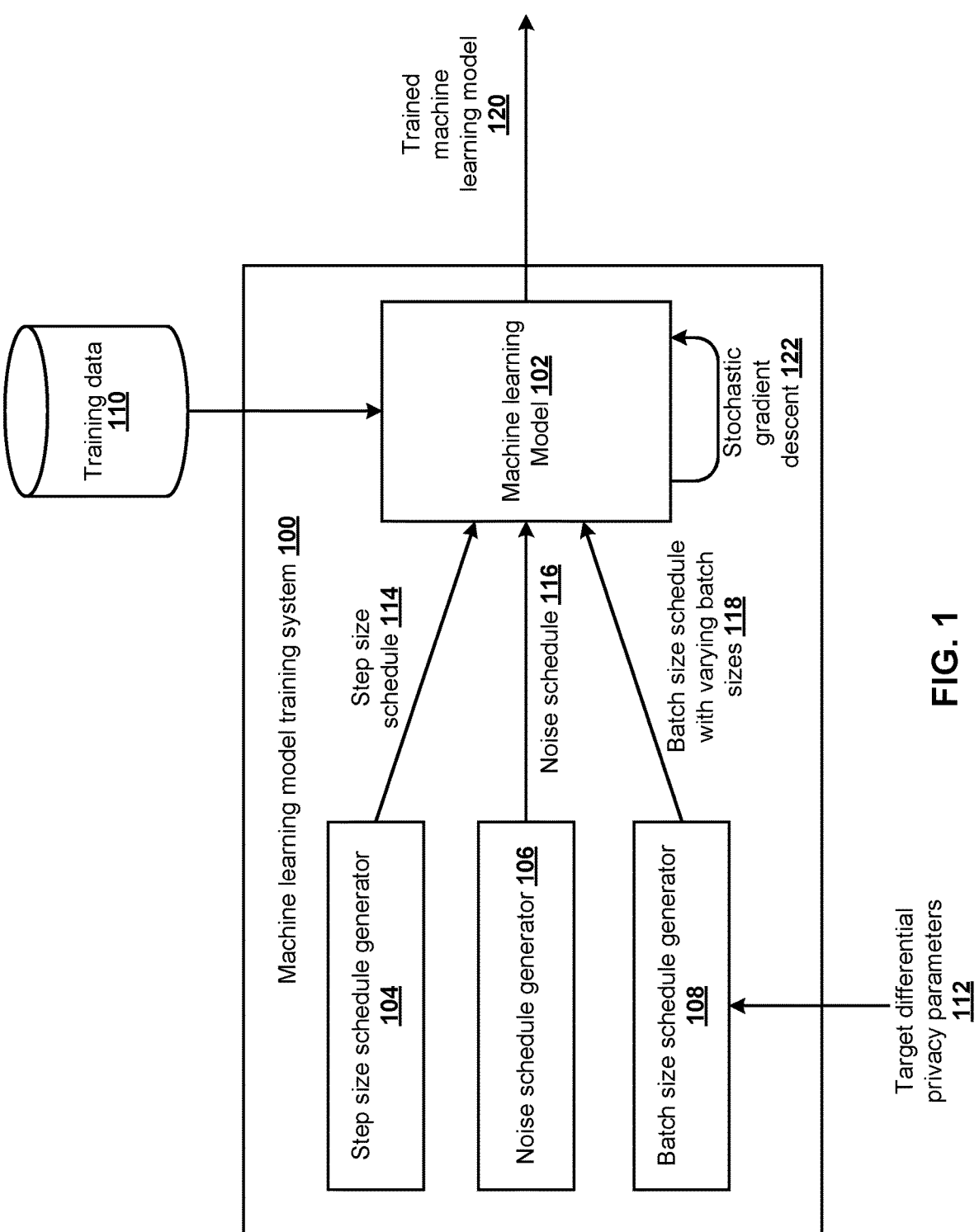
FIG. 1 is a block diagram of an example system for training a machine learning model to achieve target differential privacy whilst preserving model accuracy using stochastic convex optimization with varying batch sizes.

Example Hardware: DP SCO Via One-Pass Noisy Stochastic Gradient Descent with Varying Batch Sizes FIG. 1 is a block diagram of an example system for training a machine learning model to achieve target differential privacy whilst preserving model accuracy using stochastic convex optimization with varying batch sizes. The system 100 is an example of a system implemented as computer programs on one or more computers in one or more locations, in which the systems, components, and techniques described below, can be implemented.

The example system 100 receives training data 110 and data representing target values of differential privacy parameters 112. The system 100 can receive the training data 110 and target values of differential privacy parameters 112 in any of a variety of ways. For example, the system 100 can receive the training data 110 and target values of differential privacy parameters 112 as an upload from a remote user of the system over a data communication network, e.g., using an application programming interface (API) made available by the system 100. As another example, the system 100 can receive an input from a user specifying which data of data that is already maintained by the system 100 should be used for training the machine learning model 102. Similarly, the system 100 can receive an input from a user specifying.

The system uses the training data 110 and target values of differential privacy parameters 112 to train a machine learning model 102 to perform a particular machine learning task. The type of data included in the training data 110 is dependent on the machine learning model 102 and the machine learning task to be performed by the machine learning model 102. The machine learning model 102 can be configured to receive any kind of digital data input and to generate any kind of score, classification, or regression output based on the input.

For example, if the training data 110 includes images or features that have been extracted from images, outputs generated by the machine learning model 102 for a given image may be scores for each of a set of object categories, with each score representing an estimated likelihood that the image contains an image of an object belonging to the category.

As another example, if the training data 110 includes Internet resources (e.g., web pages), documents, or portions of documents or features extracted from Internet resources, documents, or portions of documents, outputs generated by the machine learning model 102 for a given Internet resource, document, or portion of a document may be a score for each of a set of topics, with each score representing an estimated likelihood that the Internet resource, document, or document portion is about the topic.

As another example, if the training data includes sequences of text in one language, outputs generated by the machine learning model may be a score for each of a set of pieces of text in another language, with each score representing an estimated likelihood that the piece of text in the other language is a proper translation of the input text into the other language.

As another example, if the training data includes sequences representing a spoken utterance, outputs generated by the machine learning model 102 may be a score for each of a set of pieces of text, each score representing an estimated likelihood that the piece of text is the correct transcript for the utterance.

In any of the previous examples, the training data can include sensitive data.

The system 100 includes a step size schedule generator 104, a noise schedule generator 106, and a batch size schedule generator 108. To train the machine learning model 102, the system 100 uses the training data 110 to perform a stochastic gradient descent algorithm 122 to adjust a convex machine learning model loss function. The stochastic gradient descent algorithm 122 is performed according to a step size schedule 114 generated by the step size schedule generator 104, noise schedule 116 generated by the noise schedule generator 106, and batch size schedule 118 generated by the batch size schedule 108. The system determines the step size schedule 114, noise schedule 116 and batch size schedule 118 based on the amount of data included in the training data 110, the values of the target differential privacy parameters 112 and a total number of time steps for the stochastic gradient descent algorithm (which can be received as input or selected by the system). Example techniques for determining a step size schedule, noise schedule and batch size schedule and performing a stochastic gradient descent algorithm using a determined step size schedule, noise schedule and batch size schedule are described below with reference to FIG. 2.

An output of the stochastic gradient descent algorithm 122 is used to define the convex loss function for the machine learning model and in turn define the trained machine learning model 120. When the training is complete, the system 100 can use the trained machine learning model 120 to perform the machine learning task on new data inputs, e.g., requests received by users through an API provided by the system 100. That is, the system 100 can receive inputs to be processed, use the trained neural network to process the inputs, and provide the outputs generated by the trained neural network or data derived from the generated outputs in response to the received inputs.

Alternatively or in addition, the system 100 can provide an external third party device with the trained machine learning model 120 for performing the machine learning task on new data inputs. As described in more detail below with reference to FIG. 2, the trained machine learning model 120 satisfies the conditions of differentiable privacy. This can prevent unauthorized access to sensitive data that may be achieved by sophisticated identification attacks and targeted querying attacks, e.g., using a tracker, on the model aimed at inferring the sensitive data from the model. Since sensitive data cannot be reverse engineered from the model, no indirect unauthorized access to the sensitive data can be achieved by the third party having access to just the model itself. The external third party device may thus be provided with the benefit of a model trained on the sensitive data without either direct or indirect (i.e. via inference from the model output) unauthorized access to the sensitive data.

Figure 2:
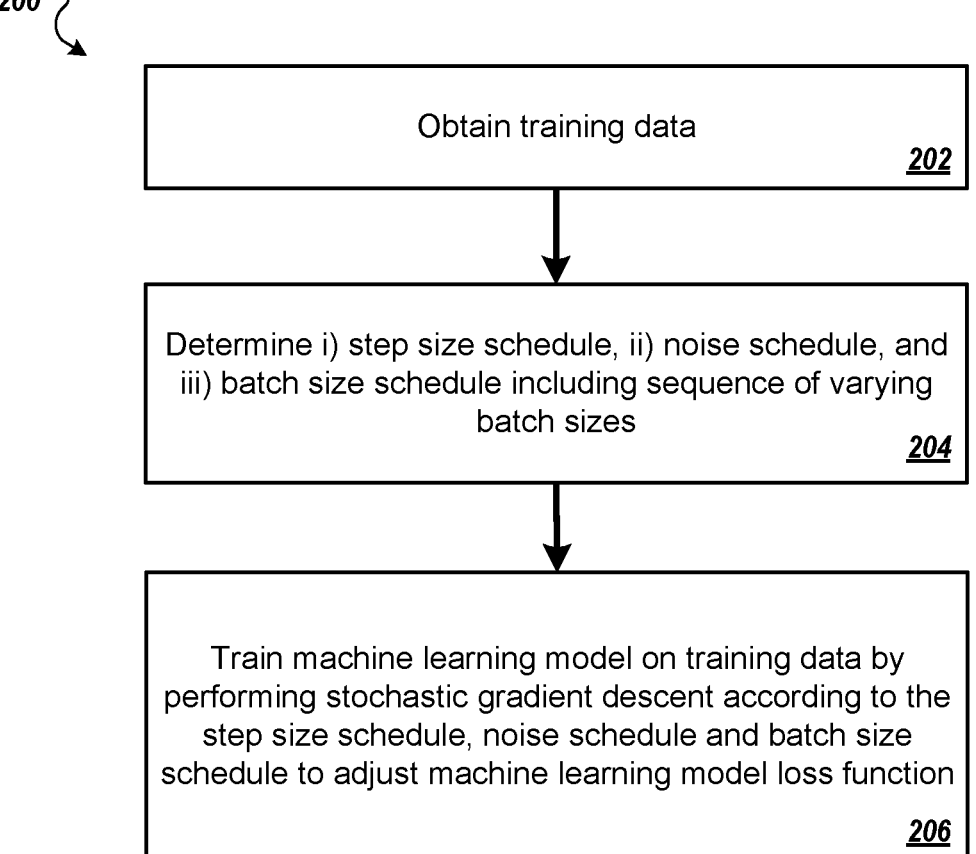
FIG. 2 is a flow diagram of an example process for training a machine learning model to achieve target differential privacy whilst preserving model accuracy using stochastic convex optimization with varying batch sizes.

Programming the Hardware: Example Process for DP SCO Via One-Pass Noisy Stochastic Gradient Descent with Varying Batch Sizes FIG. 2 is a flow diagram of an example process 200 for training a machine learning model to achieve target differential privacy whilst preserving model accuracy using stochastic convex optimization with varying batch sizes. For convenience, the process 200 will be described as being performed by a system of one or more computers located in one or more locations. For example, example system 100 of FIG. 1 can perform the process 200.

The system obtains a training data set including multiple training examples (step 202). In some implementations the training data set can include visual data and/or audio data. In some implementations the training data set can include sensitive data.

The system determines i) a stochastic gradient descent step size schedule, ii) a stochastic gradient descent noise schedule, and iii) a stochastic gradient descent batch size schedule that includes a sequence of varying batch sizes (step 204).

The stochastic gradient descent batch size schedule includes a sequence of varying batch sizes. The batch sizes in the sequence of varying batch sizes can monotonically increase. For example, for a sequence of varying batch sizes of predetermined length T, a batch size $B_t$ at position $1 \le t \le T$ in the sequence can be proportional to $$1/\sqrt{T-t+1}.$$

Generally, the batch sizes in the sequence of varying batch sizes can increase at a rate that is dependent on the dimension of the machine learning model, where the rate increases as the dimension increases. In addition, a maximum batch size in the sequence of varying batch sizes can be dependent on the dimension of the machine learning model, where the maximum batch size increases as the dimension increases. Further, batch sizes in the sequence of varying batch sizes can decrease as the number of training examples in the training data set used to train the machine learning model increases and increase as a target machine learning model differential privacy increases. Example batch size schedules are described below.

The stochastic gradient descent step size schedule and stochastic gradient descent noise schedule include a sequence of step sizes and a sequence of noise parameters, respectively. The step sizes in the sequence of step sizes can vary or can be constant. For example, in some implementations the step sizes in the sequence of step sizes can decrease in size after a particular position in the sequence of step sizes. In some implementations the step size schedule can be based on a target machine learning model accuracy.

The noise parameters in the sequence of noise parameters can also vary or be constant. In some implementations the noise parameters can include Gaussian noise parameters. In some implementations the values of the noise parameters are determined based on one or more of: the dimension of the machine learning model, the Lipschitz continuity of the machine learning model loss function, or the rate of change of the machine learning model loss function. Example step size schedules and noise schedules are described below.

In any one of the above described cases, the stochastic gradient descent step size schedule, stochastic gradient descent noise schedule, and stochastic gradient descent batch size schedule can be determined such that the trained machine learning model satisfies the target differential privacy, e.g., a Renyi differential privacy (RDP). For example, the system can select (or receive input data specifying) a machine learning model loss function $f(\bullet, x)$ from a family of convex L-Lipschitz and $\beta$-smooth functions over a convex set $\mathcal{K} \subseteq \mathbb{R}^d$, select (or receive input data specifying) target values of differential privacy parameters $\alpha$, $\alpha \cdot \rho^2/2$, select (or receive input data specifying) a total number T of time steps, and determine a sequence of step sizes $\{\eta_t\}_{t \in [T]}$ such that $\eta_t \le 2/\beta$ for all $t \in [T]$, a sequence of T noise parameters $\{\sigma_t\}_{t \in [T]}$, and a sequence of T varying batch sizes $\{B_t\}_{t \in [T]}$, where the sequence of T step sizes $\{\eta_t\}_{t \in [T]}$, sequence of T noise parameters $\{\sigma_t\}_{t \in [T]}$, and sequence of T varying batch sizes $\{B_t\}_{t \in [T]}$ satisfy $(\alpha, \alpha \cdot \rho^2/2)$–RDP with $\alpha \ge 1$, where $$\rho = 2 \; L \cdot \max_{t \in [T]} \left\{ \frac{\eta_t}{B_t \sqrt{\sum_{s=t}^{T} \eta_s^2 \sigma_s^2}} \right\}$$

where L represents the Lipschitz continuity of the machine learning model loss function $f$.

Example Batch Size Schedule I

In some implementations, at step 204, the system can select (or receive input data specifying) target values of differential privacy parameters $\alpha$, $\alpha \cdot \rho^2/2$ (with $\rho > 0$ and $\alpha \ge 1$) and a total number of time steps T. The values of the differential privacy parameters can depend on the type of training data and/or the machine learning task the machine learning model will perform, e.g., the target values of differential privacy can increase with increasing training data sensitivity. The number of time steps can depend on a target computational runtime or other resource considerations.

The system can then determine a sequence of T varying batch sizes, where a t-th batch size $B_t$ in the sequence of T varying batch sizes is equal to $$B_t = \lceil 2\sqrt{d/(T-t+1)}/\rho \rceil$$

where d represents the dimension of the machine learning model. In these cases, the number of training samples necessary to train the machine learning model is equal to the sum of the batch sizes $B_t$.

The system can also determine a sequence of T step sizes, where each step size in the sequence of T step sizes has a constant value, e.g., equal to $D/(L\sqrt{2T})$ with L representing the Lipschitz continuity of the machine learning model loss function and D representing a diameter of a convex set of machine learning model weights. In cases where the convex function is $\lambda$-strongly convex, the system can set each step size to have a constant value equal to $$\frac{2\log T}{\lambda T}.$$

The system can also determine a sequence of T noise parameters, where each noise parameter in the sequence of T noise parameters has a constant value, e.g., equal to $L/\sqrt{d}$.

In these implementations the machine learning model can achieve utility in a last iterate of the performed stochastic gradient descent and, as described above, satisfy $(\alpha, \alpha \cdot \rho^2/2)$–RDP. In addition, in these implementations the population loss satisfies the following bound $$\mathbb{E}[F(\hat{w})] \le F^* + \left( \sqrt{32 \; DL \cdot \ln(10 \; n)} \left( \frac{1}{\sqrt{n}} + \frac{2\sqrt{d}}{\rho n} \right) \right).$$

Example Batch Size Schedule II

In some implementations, at step 204, the system can select (or receive input data specifying) target values of differential privacy parameters $\alpha$, $\alpha \cdot \rho^2/2$ and a total number of time steps T. The system can then determine a sequence of T varying batch sizes, where a t-th batch size $B_t$ in the sequence of T varying batch sizes is equal to $$B_t = \lceil 4\sqrt{3d/(T-t+1)}/\rho \rceil$$

where d represents the dimension of the machine learning model. In these cases, the number of training samples necessary to train the machine learning model is equal to the sum of the batch sizes $B_t$.

The system can also determine a sequence of T step sizes, where each step size in the sequence of T step sizes has a constant value, e.g., equal to $$\bar{\eta}\left( \frac{D}{L\sqrt{2}} \right)$$

with L representing the Lipschitz continuity of the machine learning model loss function, D representing a diameter of a convex set of machine learning model weights and $\bar{\eta}$ representing a function $\bar{\eta}(c) = c 2^{-i}/\sqrt{T}$ for constant c, $0 \le i \le 1$ and $T_i < t < T_{i+1}$ where $T_i = T - \lceil T \cdot 2^{-i} \rceil$ and $T_{i+1} = T$. The system can also determine a sequence of T noise parameters, where each noise parameter in the sequence of T noise parameters is equal to $L/\bar{d}$.

In these implementations the machine learning model achieves utility in a last iterate of the performed stochastic gradient descent and, as described above, satisfy $(\alpha, \alpha \cdot \rho^2/2)$–RDP. In addition, in these implementations the population loss satisfies the following bound $$\mathbb{E}[F(\hat{w})] \leq F^* + \left(30\sqrt{2}\ DL\cdot\left(\frac{1}{\sqrt{n}} + \frac{3\sqrt{3}d}{\rho n}\right)\right).$$

Returning to FIG. 2, the system trains a machine learning model on the training data set (step 206). Training the machine learning model includes performing stochastic gradient descent according to the i) stochastic gradient descent step size schedule, ii) stochastic gradient descent noise schedule, and iii) stochastic gradient descent batch size schedule determined at step 204 to adjust a loss function for the machine learning model. For example, the system can implement a projected noisy stochastic gradient descent algorithm to adjust the machine learning model loss function. That is, for a data set $S=(x_1, \ldots, x_n)$, starting point $w_0$, number of steps T, batch size schedule $B_1, \ldots B_T$ with $\Sigma_{t\in[T]}$ $B_t=n$, step size schedule $\eta_1, \ldots, \eta_T$ and noise schedule $\sigma_1, \ldots, \sigma_T$ the system can update the machine learning model loss function $f(w, x)$ using the update rule $v_{t+1}=w_t-\eta_{t+1}(\nabla_w F_{t+1}$ $(w_t)+\xi_{t+1})$ and $w_{t+1}=\prod_{\mathcal{K}}(v_{t+i})$ where $F_{t+1}$ represents an average of loss functions for samples in batch t+1, that is $$F_{t+1}(w) = \frac{1}{B_{t+1}} \sum_{i=1+\Sigma_{s\leq t}B_s}^{i=1+\Sigma_{s\leq t+1}B_s} f(w, x_1)$$

$\xi_{t+1}$ represents a sample drawn from a $\mathcal{N}(0, \sigma_{t+1}^2\mathbb{I}_d)$ distribution and $\prod_{\mathcal{K}}(v_{t+1})$ represents a Euclidean projection of $v_{t+1}$ to set $\mathcal{K}$ (where the loss function $f$ is over the convex set $\mathcal{K}\subseteq\mathbb{R}^d$). The output of the projected noisy stochastic gradient descent algorithm is a final iteration $w_n$, which can be used to define the loss function for the machine learning model.

The system can then provide the trained machine learning model for use in inference tasks.

Example Hardware: DP SCO Via Iterative Localization

Figure 3:
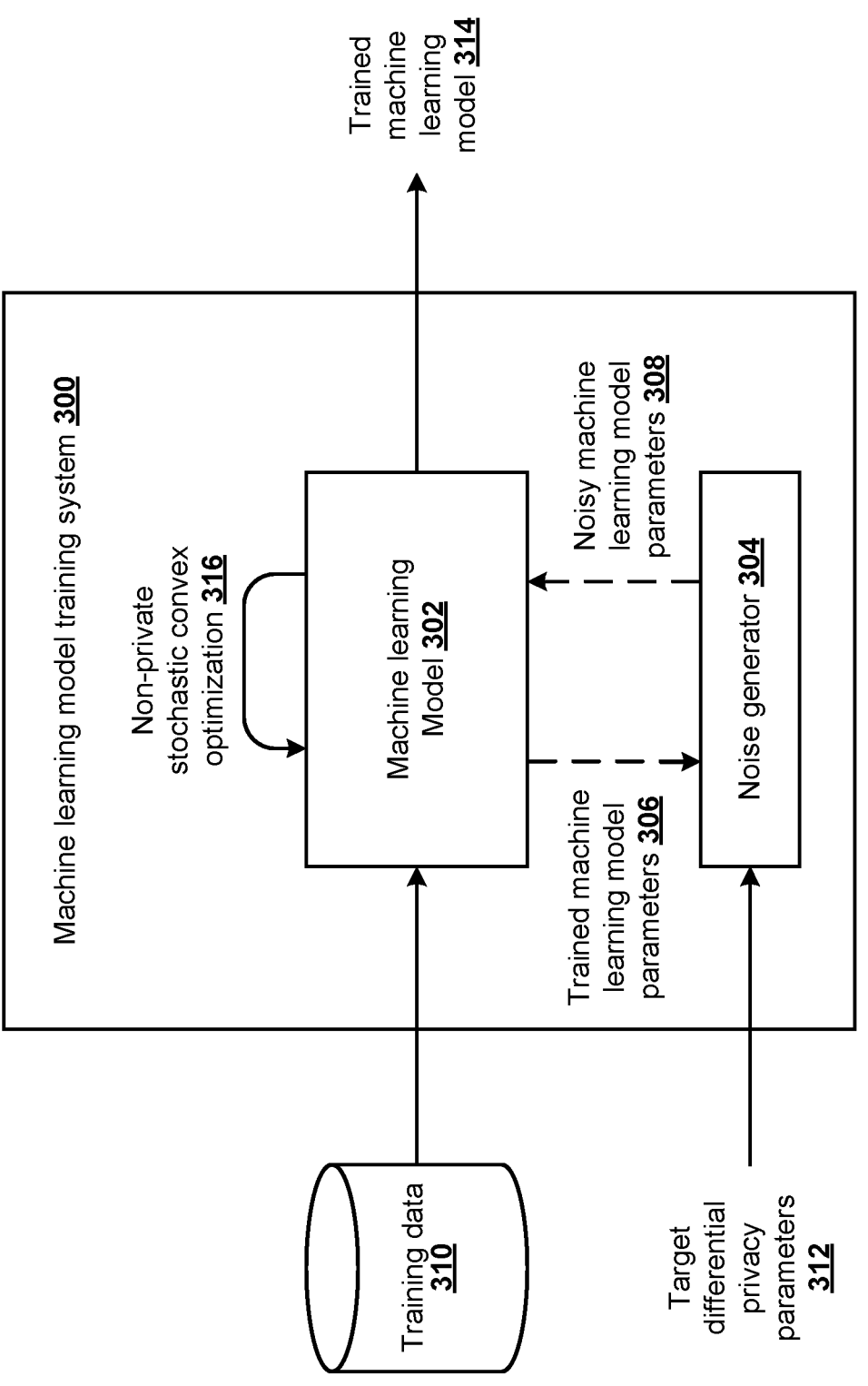
FIG. 3 is a block diagram of an example system for training a machine learning model to achieve target differential privacy whilst preserving model accuracy using a localization algorithm.

FIG. 3 is a block diagram of an example system 300 for training a machine learning model to achieve target differential privacy whilst preserving model accuracy using a localization algorithm. The system 300 is an example of a system implemented as computer programs on one or more computers in one or more locations, in which the systems, components, and techniques described below, can be implemented.

The example system 300 receives training data 310 and data representing target values of differential privacy parameters 312. The system 300 can receive the training data 310 and target values of differential privacy parameters 312 in any of a variety of ways. For example, the system 300 can receive the training data 310 and target values of differential privacy parameters 312 as an upload from a remote user of the system over a data communication network, e.g., using an application programming interface (API) made available by the system 300. As another example, the system 300 can receive an input from a user specifying which data of data that is already maintained by the system 300 should be used for training the machine learning model 302. Similarly, the system 300 can receive an input from a user specifying.

The system uses the training data 310 and target values of differential privacy parameters 312 to train the machine learning model 302 to perform a particular machine learning task. The type of data included in the training data 310 is dependent on the machine learning model 302 and the machine learning task to be performed by the machine learning model 302. The machine learning model 302 can be configured to receive any kind of digital data input and to generate any kind of score, classification, or regression output based on the input.

For example, if the training data 310 includes images or features that have been extracted from images, outputs generated by the machine learning model 302 for a given image may be scores for each of a set of object categories, with each score representing an estimated likelihood that the image contains an image of an object belonging to the category.

As another example, if the training data 310 includes Internet resources (e.g., web pages), documents, or portions of documents or features extracted from Internet resources, documents, or portions of documents, outputs generated by the machine learning model 302 for a given Internet resource, document, or portion of a document may be a score for each of a set of topics, with each score representing an estimated likelihood that the Internet resource, document, or document portion is about the topic.

As another example, if the training data includes sequences of text in one language, outputs generated by the machine learning model may be a score for each of a set of pieces of text in another language, with each score representing an estimated likelihood that the piece of text in the other language is a proper translation of the input text into the other language.

As another example, if the training data includes sequences representing a spoken utterance, outputs generated by the machine learning model 302 may be a score for each of a set of pieces of text, each score representing an estimated likelihood that the piece of text is the correct transcript for the utterance.

In any of the previous examples, the training data can include sensitive data.

To train the machine learning model 302, the system 300 iteratively localizes a minimizer of population loss until a predetermined number of iterations is completed. At each iteration, the system 300 trains the machine learning model 302 on the training data 310, e.g., a disjoint subset of the training data 310, using a non-private stochastic convex optimization algorithm 316. Example non-private stochastic convex optimization algorithms used by the system 300 are described below with reference to FIG. 4.

The non-private stochastic convex optimization algorithm produces trained machine learning model parameters 306 that are provided to the noise generator 304. The noise generator 304 determines a quantity of noise to add to the trained machine learning model parameters 306. The quantity of noise can be dependent on the current iteration and the data representing the target values of differential privacy parameters 312. Determining noise to add to trained machine learning model parameters is described below with reference to FIG. 4. The noise generator 304 adds the determined quantity of noise to the trained machine learning model parameters 306 to generate noisy machine learning model parameters 308.

The noisy machine learning model parameters 308 are then used to update the machine learning model 302 and generate a noisy machine learning model. The noisy machine learning model can then be trained using a non-private stochastic convex optimization algorithm in a subsequent iteration, as described above. If the iteration is a final iteration, the system 300 uses the noisy machine learning model as a final, trained machine learning model 314. The system can use the trained machine learning model 314 to perform the machine learning task on new data inputs, e.g., requests received by users through an API provided by the system 300. That is, the system 300 can receive inputs to be processed, use the trained neural network to process the inputs, and provide the outputs generated by the trained neural network or data derived from the generated outputs in response to the received inputs.

Alternatively or in addition, the system 300 can provide an external third party device with the trained machine learning model 314 for performing the machine learning task on new data inputs. As described in more detail below with reference to FIG. 4, the trained machine learning model 314 satisfies the conditions of differentiable privacy. This can prevent unauthorized access to sensitive data that may be achieved by sophisticated identification attacks and targeted querying attacks, e.g., using a tracker, on the model aimed at inferring the sensitive data from the model. Since sensitive data cannot be reverse engineered from the model, no indirect unauthorized access to the sensitive data can be achieved by the third party having access to just the model itself.

Programming the Hardware: Example Process for DP SCO Via Iterative Localization

Figure 4:
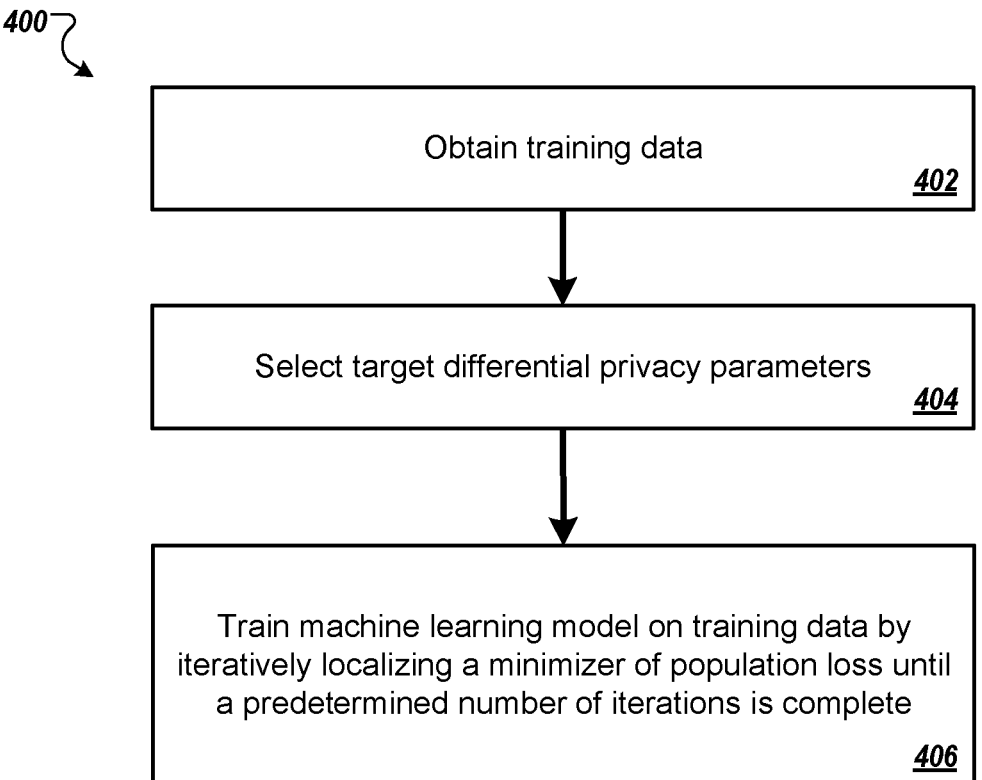
FIG. 4 is a flow diagram of an example process for training a machine learning model to achieve target differential privacy whilst preserving model accuracy using a localization algorithm.

FIG. 4 is a flow diagram of an example process 400 for training a machine learning model to achieve target differential privacy whilst preserving model accuracy using a localization algorithm. For convenience, the process 400 will be described as being performed by a system of one or more computers located in one or more locations. For example, example system 300 of FIG. 3 can perform the process 400.

The system obtains a training data set including multiple training examples (step 402). In some implementations the training data set can include visual data and/or audio data. In some implementations the training data set can include sensitive data.

The system selects (or receives a data input specifying) one or more target values of differential privacy parameters (step 404).

The system iteratively localizes a minimizer of population loss until a predetermined number of iterations is completed (step 406). In some implementations the predetermined number of iterations is equal to the ceiling function of the logarithm base 2 of the number of the plurality of training examples.

At each iteration an input machine learning model for the iteration is trained (optionally on a respective subset of the training data set, where respective subsets are disjoint subsets of the training data) using a non-private stochastic convex optimization algorithm to adjust a convex loss function and obtain trained machine learning model parameters. In some implementations the non-private stochastic convex optimization algorithm produces outputs with bounded L2-sensitivity (in other words, the parameter space is uniformly stable). Example algorithms for training the machine learning model are described below.

Stochastic Gradient Descent: Sufficiently Smooth Convex Loss Function

In some implementations the system can perform a stochastic gradient descent algorithm to train the machine learning model for the iteration. For example, the system can perform a stochastic gradient descent algorithm in cases where the convex loss function is sufficiently smooth, e.g., cases where the smoothness parameter $\beta$ is at most $\sqrt{n}$.

To perform a stochastic gradient descent algorithm, the system determine a total number of steps $n_1$ for the iteration.

The total number of steps for the iteration can be equal to $2^{-i}n$ where n represents the number of training examples obtained at step 402 and i represents the iteration. The system can then determine a step size $\eta_i$ for the iteration. In some implementations the determined step sizes can form a step size schedule with exponential decay. For example, the step size $\eta_i$ for the iteration can be equal to $4^{-i}\eta$, where $\eta$ represents a predetermined fixed step size. The system can then run a non-private stochastic convex optimization algorithm with the step size for the iteration and for the total number of steps for the iteration. In some implementations running the non-private stochastic convex optimization algorithm can include performing a projected stochastic gradient descent algorithm. The system can then compute an average value $\overline{w}_\iota$ of the loss function parameters for the iteration i as output of the non-private stochastic convex optimization algorithm for the iteration, e.g., as trained machine learning model parameters for the iteration.

In the same iteration, the system adds noise to the trained machine learning model parameters, e.g., the system computes $\overline{w}_\iota := \overline{w}_\iota + \xi_i$. The amount and type of noise that is added at each iteration is dependent on the target machine learning model differential privacy parameters selected (or received) at step 404 and the step size $\eta_i$ for the iteration. For example, the system can sample the noise from a d-dimensional normal distribution with zero mean and standard deviation equal to $$\sigma_i = 4L\eta_i/\rho$$

where d represents the machine learning model dimension, L represents the Lipschitz continuity of the convex loss function, $\eta_i$ represents non-private stochastic convex optimization algorithm step size for the iteration, and $\rho$ represents a target differential privacy parameter.

The noisy trained machine learning model parameters $\overline{w}_\iota + \xi_i$ are then provided as input to a subsequent iteration, or is provided as output if the iteration is a final iteration.

In these implementations the population loss satisfies the following bound $$\mathbb{E}[F(\hat{w})] \le F^* + \left( 10\, DL \cdot \left( \frac{1}{\sqrt{n}} + \frac{\sqrt{d}}{\rho n} \right) \right).$$

Stochastic Gradient Descent: Strongly Convex Loss Function

In some implementations the system performs a stochastic gradient descent algorithm in cases where the convex loss function is a $\lambda$-strongly convex loss function.

In these implementations, the system also determines a total number of steps $n_i$ for the iteration, however in these implementations the total number of steps for the iteration is equal to n/k where n represents the number of training examples and k represents the predetermined number of iterations (as defined at step 406) and is equal to ln ln n. The system then determines a step size $\eta_i$ for the iteration. In some implementations the determined step sizes can form a step size schedule with double exponential decay. For example, the determined step size for the iteration can be equal to $2^{-i}\eta$ with $\eta$ proportional to ln n/n, e.g., $$\eta = \frac{4\, ck \ln n}{\lambda n}$$

17 for $c \geq 1$. The system then runs the non-private stochastic convex optimization algorithm with the step size for the iteration and for the total number of steps for the iteration as described above, e.g., by performing a projected stochastic gradient descent algorithm and computing an average value $\overline{w}_t$ of the loss function parameters for the iteration i as output of the non-private stochastic convex optimization algorithm for the iteration. As described above in the non-strongly convex case, in the same iteration, the system adds noise to the trained machine learning model parameters and provides the noisy machine learning model parameters are input to a subsequent iteration or as an output if the iteration is the final iteration. The quantities of noise for the iterations can decrease with decreasing step sizes for the iterations.

Empirical Risk Minimization

In some implementations the system can perform an empirical risk minimization algorithm to train the machine learning model for the iteration, e.g., in cases where the convex loss function is non-smooth.

In these implementations the system can determine a total number of steps $n_i$ for the iteration. The total number of steps for the iteration can be equal to $2^{-i}n$ where n represents the number of training examples obtained at step 402 and i represents the iteration. The system can then determine a step size $\eta_i$ for the iteration. The step size $\eta_i$ for the iteration can be equal to $4^{-i}\eta$, where $\eta$ represents a predetermined fixed step size. The system can then compute trained machine learning model parameters for the iteration $\tilde{w}_i$ using an empirical risk minimization algorithm, e.g., by computing $\tilde{w}_i \in \mathcal{K}$ such that $F_i(\tilde{w}_i) - \text{argi} \, n_{w \in \mathcal{K}} \, F_i(w) \leq L^2 \eta_i / n_i$ with probability $(1-\delta)$ for $$F_i(w) = \frac{1}{n_i}\sum_{t=1}^{n_i} f(w, x_t) + \frac{1}{\eta_i n_i}\|w - w_{i-1}\|_2^2$$

In the same iteration, the system adds noise to the trained machine learning model parameters, e.g., the system computes $\tilde{w}_i := \tilde{w}_i + \xi_i$. The amount and type of noise that is added at each iteration is dependent on the target machine learning model differential privacy parameters selected (or received) at step 404 and the step size $\eta_i$ for the iteration. For example, the system can sample the noise from a d-dimensional normal distribution with zero mean and standard deviation equal to $$\sigma = 4L(\eta_i/\epsilon)\sqrt{\ln(1/\delta)}$$

where d represents the machine learning model dimension, L represents the Lipschitz continuity of the convex loss function, $\eta_i$ represents the step size for the iteration, and $\in$, $\delta$ represents the target differential privacy parameters. The quantities of noise for the iterations can decrease with decreasing step sizes for the iterations.

The noisy trained machine learning model parameters $\tilde{w}_i + \xi_i$ are then provided as input to a subsequent iteration, or is provided as output if the iteration is a final iteration.

Returning to FIG. 4, after the system completes step 406 using either stochastic gradient descent or empirical risk minimization, the system uses the final iteration $\overline{w}_t + \xi_i$ or $\tilde{w}_i + \xi_i$ to define the loss function for the machine learning model and therefore define the trained machine learning model. The system can then provide the trained machine learning model for use in inference tasks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g. an HTML page, to a user device, e.g. for purposes of displaying data to and receiving user input from a user interacting with the user device, which acts as a client. Data generated at the user device, e.g. as a result of the user interaction, can be received from the user device at the server.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for computationally efficient differentially private training of a machine learning model, the method comprising:

obtaining a training data set comprising a plurality of training examples, wherein the training data set comprises sensitive data;

receiving data specifying a target differential privacy defined by target differential privacy parameters;

determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, the sequence having a predetermined length, wherein the sequence of varying batch sizes has predetermined length, and wherein a batch size at a respective position in the sequence is proportional to an inverse of a square root of a difference between the predetermined length and the respective position; and a batch size at a respective position in the sequence specifies a number of training examples to process at a corresponding step of a stochastic gradient descent algorithm before parameters of a machine learning model loss function are adjusted and a subsequent step of the stochastic gradient descent algorithm is performed;

training a machine learning model to perform a machine learning task on the training data set to generate a trained machine learning model that satisfies the target differential privacy, comprising performing the stochastic gradient descent algorithm according to the i) stochastic gradient descent step size schedule, ii) stochastic gradient descent noise schedule, and iii) stochastic gradient descent batch size schedule that comprises the sequence of varying batch sizes to adjust the machine learning model loss function, wherein performing the stochastic gradient descent algorithm comprises computing a gradient of the machine learning model loss function n times, wherein n is equal to a number of training examples included in the plurality of training examples; and providing the trained machine learning model to an external third party device, wherein the external third party device performs the machine learning task on new data inputs without direct or indirect unauthorized access to the sensitive data included in the training data set.

2. The method of claim 1, wherein the sequence of varying batch sizes comprises a monotonically increasing sequence of varying batch sizes.

3. The method of claim 1, wherein batch sizes in the sequence of varying batch sizes increase at a rate that is dependent on the dimension of the machine learning model, wherein the rate increases as the dimension increases.

4. The method of claim 1, wherein a maximum batch size in the sequence of varying batch sizes is dependent on the dimension of the machine learning model, wherein the maximum batch size increases as the dimension increases.

5. The method of claim 1, wherein batch sizes in the sequence of varying batch sizes decrease as the number of training examples in the training data set increases.

6. The method of claim 1, wherein determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises:

receiving data specifying target values of differential privacy parameters $\alpha$, $\alpha \cdot \rho^2/2$;

receiving data specifying a total number of time steps T; and determining i) a sequence of T step sizes $\{\eta_t\}_{t \in T}$, ii) a sequence of T noise parameters $\{\sigma_t\}_{t \in T}$, and iii) a sequence of T varying batch sizes $\{B_t\}_{t \in T}$, wherein the sequence of T step sizes $\{\eta_t\}_{t \in T}$, sequence of T noise parameters $\{\sigma_t\}_{t \in T}$, and sequence of T varying batch sizes $\{B_t\}_{t \in T}$ satisfy $$\rho = 2 \ L \cdot \max_{t \in [T]} \left\{ \frac{\eta_t}{B_t \sqrt{\sum_{s=t}^{T} \eta_s^2 \sigma_s^2}} \right\}$$

where L represents the Lipschitz continuity of the machine learning model loss function.

7. The method of claim 6, wherein the machine learning loss function is $\beta$-smooth, and wherein each step size in the sequence of T step sizes is less than or equal to $2/\beta$.

8. The method of claim 1, wherein the determined stochastic gradient descent step size schedule comprises a sequence of varying step sizes, the determined stochastic gradient descent noise schedule comprises a sequence of varying noise parameters, or both the determined stochastic gradient descent step size schedule comprises a sequence of varying step sizes and the determined stochastic gradient descent noise schedule comprises a sequence of varying noise parameters.

9. The method of claim 1, wherein determining a stochastic gradient descent step size schedule comprises determining the stochastic gradient descent step size schedule based on a target machine learning model accuracy.

10. The method of claim 1, wherein determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises:

receiving data specifying target values of differential privacy parameters $\alpha$, $\alpha \cdot \rho^2/2$;

receiving data specifying a total number of time steps T;

determining a sequence of T varying batch sizes, wherein a t-th batch size in the sequence of T varying batch sizes is equal to $\lceil 2\sqrt{d}/(T-t+1)/\rho \rceil$ where d represents the dimension of the machine learning model;

determining a sequence of T step sizes, wherein each step size in the sequence of T step sizes is equal to $D/(L\sqrt{2T})$ where L represents the Lipschitz continuity of the machine learning model loss function and D represents a diameter of a convex set of machine learning model weights; and determining a sequence of T noise parameters, wherein each noise parameter in the sequence of T noise parameters is equal to $L/\sqrt{d}$.

11. The method of claim 1, wherein the determined stochastic gradient descent step size schedule comprises a sequence of step sizes that decrease in size after a particular position in the sequence of step sizes.

12. The method of claim 1, wherein determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, comprises:

receiving data specifying target values of differential privacy parameters $\alpha$, $\alpha \cdot \rho^2/2$;

receiving data specifying a total number of time steps T;

determining a sequence of T varying batch sizes, wherein a t-th batch size in the sequence of T varying batch sizes is equal to $\lceil 4\sqrt{3d}/(T-t+1)/\rho \rceil$ where d represents the dimension of the machine learning model; and determining a sequence of T noise parameters, wherein each noise parameter in the sequence of T noise parameters is equal to $L/\sqrt{d}$.

13. A system comprising one or more computers and one or more storage devices storing instructions that are operable, when executed by the one or more computers, to cause the one or more computers to perform operations for computationally efficient differentially private training of a machine learning model, the operations comprising:

obtaining a training data set comprising a plurality of training examples, wherein the training data set comprises sensitive data;

receiving data specifying a target differential privacy defined by target differential privacy parameters;

determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, the sequence having a predetermined length, wherein the sequence of varying batch sizes has predetermined length, and wherein a batch size at a respective position in the sequence is proportional to an inverse of a square root of a difference between the predetermined length and the respective position; and a batch size at a respective position in the sequence specifies a number of training examples to process at a corresponding step of a stochastic gradient descent algorithm before parameters of a machine learning model loss function are adjusted and a subsequent step of the stochastic gradient descent algorithm is performed; and training a machine learning model to perform a machine learning task on the training data set to generate a trained machine learning model that satisfies the target differential privacy, comprising performing the stochastic gradient descent algorithm according to the i) stochastic gradient descent step size schedule, ii) stochastic gradient descent noise schedule, and iii) stochastic gradient descent batch size schedule that comprises the sequence of varying batch sizes to adjust the machine learning model loss function, wherein performing the stochastic gradient descent algorithm comprises computing a gradient of the machine learning model loss function n times, wherein n is equal to a number of training examples included in the plurality of training examples; and providing the trained machine learning model to an external third party device, wherein the external third party device performs the machine learning task on new data inputs without direct or indirect unauthorized access to the sensitive data included in the training data set.

14. One or more non-transitory computer storage media encoded with instructions that, when executed by one or more computers, cause the one or more computers to perform operations for computationally efficient differentially private training of a machine learning model, the operations comprising:

obtaining a training data set comprising a plurality of training examples, wherein the training data set comprises sensitive data;

receiving data specifying a target differential privacy defined by target differential privacy parameters;

determining i) a stochastic gradient descent step size schedule, ii) a stochastic gradient descent noise schedule, and iii) a stochastic gradient descent batch size schedule, wherein the stochastic gradient descent batch size schedule comprises a sequence of varying batch sizes, the sequence having a predetermined length, wherein the sequence of varying batch sizes has predetermined length, and wherein a batch size at a respective position in the sequence is proportional to an inverse of a square root of a difference between the predetermined length and the respective position; and a batch size at a respective position in the sequence specifies a number of training examples to process at a corresponding step of a stochastic gradient descent algorithm before parameters of a machine learning model loss function are adjusted and a subsequent step of the stochastic gradient descent algorithm is performed;

training a machine learning model to perform a machine learning task on the training data set to generate a trained machine learning model that satisfies the target differential privacy, comprising performing the stochastic gradient descent algorithm according to the i) stochastic gradient descent step size schedule, ii) stochastic gradient descent noise schedule, and iii) stochastic gradient descent batch size schedule that comprises the sequence of varying batch sizes to adjust the machine learning model loss function, wherein performing the stochastic gradient descent algorithm comprises computing a gradient of the machine learning model loss function n times, wherein n is equal to a number of training examples included in the plurality of training examples; and providing the trained machine learning model to an external third party device, wherein the external third party device performs the machine learning task on new data inputs without direct or indirect unauthorized access to the sensitive data included in the training data set.

15. A computer implemented method for computationally efficient differentially private training of a machine learning model, the method comprising:

obtaining a training data set comprising a plurality of training examples, wherein the training data set comprises sensitive data;

obtaining data representing a target differential privacy defined by target values of differential privacy parameters;

training a machine learning model to perform a machine learning task on the training data set to generate a trained machine learning model that satisfies the target differential privacy, comprising iteratively localizing a minimizer of population loss until a predetermined number of iterations is completed, wherein iteratively localizing a minimizer of population loss comprises, for each iteration:

training a machine learning model for the iteration on the training data set using a non-private stochastic convex optimization algorithm to adjust a convex loss function and obtain trained machine learning model parameters, comprising:

determining a total number of steps for the iteration, wherein the total number of steps for the iteration is equal to two to the power of negative i multiplied by the number of training examples and i represents the iteration;

determining a step size $n_i$ for the iteration, wherein the step size for the iteration is equal to four to the power of negative i multiplied by a predetermined fixed step size; and running the non-private stochastic convex optimization algorithm with the step size for the iteration and for the total number of steps for the iteration;

determining, based on the target values of the differential privacy parameters and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration;

wherein a total number of gradient computations performed across the predetermined number of iterations is equal to a number n of training examples included in the plurality of training examples; and providing the trained machine learning model to an external third party device, wherein the external third party device performs the machine learning task on new data inputs without direct or indirect unauthorized access to the sensitive data included in the training data set.

16. The method of claim 15, further comprising determining a non-private stochastic convex optimization step size $\eta$ based on a target machine learning model stability.

17. The method of claim 15, wherein the noisy machine learning models for the iterations achieve utility in a last step of the non-private stochastic convex optimization algorithm.

18. The method of claim 15, wherein determining, based on the target values of the differential privacy parameters and a number of previous iterations, a quantity of noise for an iteration i comprises sampling from a d-dimensional normal distribution with zero mean and standard deviation equal to $$\sigma_i = 4L\eta_i/\rho$$

where d represents the machine learning model dimension, L represents the Lipschitz continuity of the convex loss function, $\eta_i$ represents non-private stochastic convex optimization algorithm step size for the iteration, and $\rho$ represents a target differential privacy parameter.

19. The method of claim 15, wherein the convex loss function is non-smooth and the non-private stochastic convex optimization algorithm comprises an empirical risk minimization algorithm.

20. The method of claim 15, wherein training a machine learning model for the iteration on the training data set to obtain a trained machine learning model comprises training the machine learning model for the iteration on a respective subset of the training data set to obtain a trained machine learning model, wherein respective subsets of the training data set are disjoint subsets.

21. A system comprising one or more computers and one or more storage devices storing instructions that are operable, when executed by the one or more computers, to cause the one or more computers to perform operations for computationally efficient differentially private training of a machine learning model, the operations comprising:

obtaining a training data set comprising a plurality of training examples, wherein the training data set comprises sensitive data;

obtaining data representing a target differential privacy defined by target values of differential privacy parameters;

training a machine learning model to perform a machine learning task on the training data set to generate a trained machine learning model that satisfies the target differential privacy, comprising iteratively localizing a minimizer of population loss until a predetermined number of iterations is completed, wherein iteratively localizing a minimizer of population loss comprises, for each iteration:

training a machine learning model for the iteration on the training data set using a non-private stochastic convex optimization algorithm to adjust a convex loss function and obtain trained machine learning model parameters, comprising:

determining a total number of steps for the iteration, wherein the total number of steps for the iteration is equal to two to the power of negative i multiplied by the number of training examples and i represents the iteration;

determining a step size $\eta_i$ for the iteration, wherein the step size for the iteration is equal to four to the power of negative i multiplied by a predetermined fixed step size; and running the non-private stochastic convex optimization algorithm with the step size for the iteration and for the total number of steps for the iteration;

determining, based on the target values of the differential privacy parameters and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration;

wherein a total number of gradient computations performed across the predetermined number of iterations is equal to a number n of training examples included in the plurality of training examples; and providing the trained machine learning model to an external third party device, wherein the external third party device performs the machine learning task on new data inputs without direct or indirect unauthorized access to the sensitive data included in the training data set.

22. One or more non-transitory computer storage media encoded with instructions that, when executed by one or more computers, cause the one or more computers to perform operations for computationally efficient differentially private training of a machine learning model, the operations comprising:

obtaining a training data set comprising a plurality of training examples, wherein the training data set comprises sensitive data;

obtaining data representing a target differential privacy defined by target values of differential privacy parameters;

training a machine learning model to perform a machine learning task on the training data set to generate a trained machine learning model that satisfies the target differential privacy, comprising iteratively localizing a minimizer of population loss until a predetermined number of iterations is completed, wherein iteratively localizing a minimizer of population loss comprises, for each iteration:

training a machine learning model for the iteration on the training data set using a non-private stochastic convex optimization algorithm to adjust a convex loss function and obtain trained machine learning model parameters, comprising:

determining a total number of steps for the iteration, wherein the total number of steps for the iteration is equal to two to the power of negative i multiplied by the number of training examples and i represents the iteration;

determining a step size $\eta_i$ for the iteration, wherein the step size for the iteration is equal to four to the power of negative i multiplied by a predetermined fixed step size; and running the non-private stochastic convex optimization algorithm with the step size for the iteration and for the total number of steps for the iteration;

determining, based on the target values of the differential privacy parameters and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration;

wherein a total number of gradient computations performed across the predetermined number of iterations is equal to a number n of training examples included in the plurality of training examples; and providing the trained machine learning model to an external third party device, wherein the external third party device performs the machine learning task on new data inputs without direct or indirect unauthorized access to the sensitive data included in the training data set.

23. A computer implemented-method for computationally efficient differentially private training of a machine learning model, the method comprising:

obtaining a training data set comprising a plurality of training examples, wherein the training data set comprises sensitive data;

obtaining data representing a target differential privacy defined by target values of differential privacy parameters;

training a machine learning model to perform a machine learning task on the training data set to generate a trained machine learning model that satisfies the target differential privacy, comprising iteratively localizing a minimizer of population loss until a predetermined number of iterations is completed, wherein iteratively localizing a minimizer of population loss comprises, for each iteration:

training a machine learning model for the iteration on the training data set using a non-private stochastic convex optimization algorithm to adjust a convex loss function and obtain trained machine learning model parameters, wherein the convex loss function is strongly convex, and wherein training the machine learning model for the iteration on the training data set using the non-private stochastic convex optimization algorithm to adjust the convex loss function comprises implementing a step size schedule with double exponential decay;

determining, based on the target values of the differential privacy parameters and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration;

wherein a total number of gradient computations performed across the predetermined number of iterations is equal to a number n of training examples included in the plurality of training examples; and providing the trained machine learning model to an external third party device, wherein the external third party device performs the machine learning task on new data inputs without direct or indirect unauthorized access to the sensitive data included in the training data set.

24. The method of claim 23, wherein the convex loss function is strongly convex, and wherein training the machine learning model for the iteration on the training data set using the non-private stochastic convex optimization algorithm to adjust the strongly convex loss function and obtain trained machine learning model parameters comprises:

determining a total number of steps $n_i$ for the iteration, wherein the total number of steps for the iteration is equal to n/k where n represents the number of training examples and k represents the predetermined number of iterations and is equal to ln ln n;

determining a step size $\eta_i$ for the iteration, wherein the step size for the iteration is equal to $2^{-2^i} \eta$ where n is proportional to ln n/n; and running the non-private stochastic convex optimization algorithm with the step size for the iteration and for the total number of steps for the iteration.

25. A computer implemented-method for computationally efficient differentially private training of a machine learning model, the method comprising:

obtaining a training data set comprising a plurality of training examples, wherein the training data set comprises sensitive data;

obtaining data representing a target differential privacy defined by target values of differential privacy parameters;

training a machine learning model to perform a machine learning task on the training data set to generate a trained machine learning model that satisfies the target differential privacy, comprising iteratively localizing a minimizer of population loss until a predetermined number of iterations is completed, wherein the predetermined number of iterations is equal to the ceiling function of the logarithm base 2 of the number of the plurality of training examples and iteratively localizing a minimizer of population loss comprises, for each iteration:

training a machine learning model for the iteration on the training data set using a non-private stochastic convex optimization algorithm to adjust a convex loss function and obtain trained machine learning model parameters;

determining, based on the target values of the differential privacy parameters and a number of previous iterations, a quantity of noise for the iteration and adding the quantity of noise for the iteration to the trained machine learning model parameters to obtain a noisy machine learning model; and providing the noisy machine learning model as a machine learning model for a subsequent iteration;

wherein a total number of gradient computations performed across the predetermined number of iterations is equal to a number n of training examples included in the plurality of training examples; and providing the trained machine learning model to an external third party device, wherein the external third party device performs the machine learning task on new data inputs without direct or indirect unauthorized access to the sensitive data included in the training data set.

* * * * *